United States Patent Office — 3,711,426, Patented Jan. 16, 1973

3,711,426
PROCESS FOR PREPARING A CHROMIUM-PROMOTED IRON OXIDE CATALYST
Mogens Holger Jorgensen, Virum, Denmark, assignor to Haldor Frederik Axel Topsoe, Frydenlundsvej, Vedbaek, Denmark
No Drawing. Filed Feb. 26, 1970, Ser. No. 14,674
Int. Cl. B01j 11/22, 11/74
U.S. Cl. 252—440                                    6 Claims

ABSTRACT OF THE DISCLOSURE

High temperature shift catalysts comprising iron oxide are prepared from solutions of soluble iron salts by precipitation with an organic acid reagent, such as oxalic acid, giving precipitates in a very coarse, easily-washed form.

Treatment of the well-washed precipitate with alkali regenerates the organic acid reagent and gives a highly flocculent iron oxide of high specific surface and extremely low sulphur content. This is particularly suitable for promotion with PbO, which is noted as being very sensitive to sulphur contamination.

---

The present invention relates to catalysts, particularly but not exclusively to catalysts for use in the so-called high temperature water-gas shift reaction, and to the production thereof.

This reaction may be represented as:

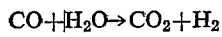

$$CO + H_2O \rightarrow CO_2 + H_2$$

Chromium-promoted iron oxide, that is to say a mixture of iron and chromium oxides, is often used in pulverised form as a catalyst in this reaction.

If the metal oxide mixture in the catalyst is to have the required chemical activity, it must be produced in a specially porous form having a large specific surface and this form cannot be obtained by mechanical disintegration of the solid material. One suitable procedure for obtaining the required surface is to precipitate a mixture of water-soluble salts of the metals by means of basic reagents such as hydroxides of alkali- and alkali-earth metals or aqueous $NH_3$. During precipitation, the metal hydroxides carry along substantial amounts of unwanted, contaminating anions, and adequate washing out and removal of these anions is not possible, particularly because of the exceedingly strong absorption potential of iron hydroxide for various anions such as chloride, sulphate, phosphate, and arsenate. In practice, therefore, iron oxide catalysts prepared by precipitation of $Fe(OH)_2$ or $Fe(OH)_3$ will contain from 1500 to 5000 p.p.m. of such unwanted anions, particularly sulphur compounds, even after exceedingly thorough washing. Because of the cheapness of iron sulphate or chloride, these water-soluble salts are the preferred raw materials for the preparation of Fe-Cr-oxide conversion catalysts.

Unfortunately, however, these chlorides and sulphates are poisons to catalysts and reduce both the activity and life of the catalysts. Furthermore, during the use of the catalysts, chloride and sulphate will be converted into volatile compounds such as HCl and $H_2S$. Besides poisoning itself, a catalyst having such a sulphate and chloride content will give off $H_2S$ and HCl to the process gas whereby the catalyst will be able to poison any other catalyst used in an associated process.

This is the case for example with the so-called low-temperature shift catalysts which are being used to an increasing extent in secondary convertors associated with water-gas shift processes having such high-temperature shift catalysts.

In order to avoid such contamination it is necessary to bleed off, and discard, the exit gas from a sulphur- or chlorine-containing catalyst until the gas has become sufficiently pure, with obvious adverse effects on efficiency.

It is one object of the present invention to provide improved high-temperature shift catalysts having significantly lower sulphur contamination.

It is a further object of the present invention to provide a process for the production of iron oxide precipitates having a negligible sulphur content, preferably less than 50 p.p.m.

It is also the object of the invention to provide such a process wherein the reagent can be recovered and thus give a continuous production cycle.

According to the present invention, I provide improved high-temperature shift catalysts comprising iron oxide precipitates containing less than 50 p.p.m. sulphur, preferably less than 20 p.p.m.

I have found that PbO can be used as promotor with an iron oxide conversion catalyst, but that if promotion takes place in the simultaneous presence of the sulphate tailings that are normally found in the production of $Fe_2O_3$, the effect of PbO as a promotor, which is significant on a fresh catalyst, disappears after some time, so that the addition of PbO is of negligible benefit to the use of the catalyst. The effect of PbO can be made lasting, however, provided that the promotion is carried out on an iron oxide catalyst that is very pure and does not contain more than say 20–50 p.p.m. S.

Therefore, according to my invention I also provide improved high-temperature shift catalysts comprising iron oxide precipitates containing less than 50 p.p.m. sulphur, preferably less than 20 p.p.m. and promoted with PbO.

Further according to the present invention, iron oxide based catalysts are prepared from solutions of soluble iron salts by precipitation as the salt of an organic acid in the form of crystals of a coarse character, washing the crystalline precipitate to remove soluble impurities, and then treating it with an alkali solution whereby flocculent iron oxide of high specific surface is obtained and the organic acid reagent is regenerated.

Mixed oxide catalysts can of course be prepared by the process of my invention using mixed solutions containing other soluble salts in addition to the soluble iron salts. During the first step of my process the water-soluble iron salts are transformed into a sparingly soluble and rough-crystalline iron salt which can easily be completely freed from impurities, because the rough-crystalline precipitate does not possess the ability of the iron oxides to absorb and retain anions.

In a preferred process, the organic acid reagent is in the form of the salt of the acid with ammonia or an alkali metal, thus facilitating the removal of the ions of the original iron salts.

Oxalic acid is very suitable for use according to my invention, usually in the form of its ammonium, sodium or potassium salt. Using sodium oxalate and ferrous sulphate my invention can give iron oxide of high specific surface which has a sulphur content of only 10 p.p.m. Ferrous oxalate is first precipitated with sodium oxalate from a solution containing ferrous sulphate. The supernatant sodium sulphate solution is discarded and the course crystalline precipitate of ferrous oxalate washed very thoroughly to remove traces of sulphate. Hydrolysis of the ferrous oxalate with sodium hydroxide then gives an acceptable precipitate of iron oxide and regenerates the sodium oxalate for further purification cycles.

It can be seen that the properties of ferrous oxalate are particularly well suited for precipitation in my process. It is sparingly soluble, easily crystallising with regular crystals having no surface-absorbing qualities, thus simplifying the removal of the sulphate and the chloride contaminating ions from the precipitate, and hydrolyses easily without decomposition of the acid, thus enhancing the recycle economics of the process.

The precipitated ferrous oxalate can therefore be washed completely free of sulphate and chloride by a very simple treatment, for example by repeated washing under decantation. Hence, isolation of the precipitate, for example by filtration, is not necessary.

Following the quantitive removal of sulphate and/or chloride from the ferrous oxalate suspension, the hydrolysis step of the process may be carried out as follows: To the pure suspension is added an amount of NaOH, KOH, or $NH_4OH$ equivalent to the ferrous oxalate. The mixture is then kept at a temperature between 50° and 100° C. until hydrolysis takes place, giving a flocculent and ultrapure $Fe(OH)_2$ which can be isolated by filtering from the alkaline solution of Na, K, or $NH_4$ oxalate. The quantity of water-soluble oxalate released during the hydrolysis is collected to be used again in the precipitation. After having been washed, the resulting $Fe(OH)_2$— suspension may be reacted with water-soluble compounds, such as chromic acid and lead nitrate which are intended for the promotion of the iron oxide.

The invention will now be described in greater detail with reference to the following examples, in which all parts are by weight.

EXAMPLE A-1

100 parts of $FeSO_4 \cdot 7H_2O$ were dissolved in 264 parts of pure, cold water. 48 parts of sodium oxalate ($Na_2C_2O_4$) were then added whilst stirring. Heating was not necessary. After an hour there was a precipitate of ferrous oxalate, $FeC_2O_4 \cdot 2H_2O$. The sulphate concentration was reduced by repeated decanting and rinsing on a filter, until a qualitative analysis for sulphate appeared to be negative. The purified ferrous oxalate was washed into 300 parts of pure water and 29 parts of NaOH or 41 parts of KOH added. The mixture was heated at 95° C. for 1 hour whereupon the $Fe(OH)_2$ formed was filtered off and rinsed. The filtrate was collected for recovery of oxalate. After rinsing, the pure $Fe(OH)_2$ was washed in water. To this was added 2 parts of chromic acid and the mixture heated for half an hour at 100° C. The precipitate was filtered and dried.

The completed catalyst was burnt for 2 hours at 400° C. Yield 28.4 parts (theoretical yield 30.2 parts).

EXAMPLE B-1

This was prepared in the same way as Example A-1 with the exception that 71 parts of $FeCl_2 \cdot 4H_2O$ were used as the iron source. Yield 29.0 parts of catalyst. (Theoretical yield 30.2).

EXAMPLE C-1

This was also prepared as Example A-1, but after the final addition of chromic acid and after heating for half an hour at 100° C., 6 parts of lead nitrate were also added. Yield 33.0 parts. (Theoretical yield 34.2.)

EXAMPLE D-1

This was prepared in the same manner as Example C-1, but with only 2½ parts of lead nitrate. Yield 31.2 parts. (Theoretical yield 32.2.)

The chemical composition of these examples was found to be:

A-1: 94.2% $Fe_2O_3$, 4.8% $Cr_2O_3$
B-1: 94.2% $Fe_2O_3$, 4.8% $Cr_2O_3$
C-1: 84% $Fe_2O_3$, 4.0% $Cr_2O_3$, 11.7% PbO
D-1: 89.5% $Fe_2O_3$, 4.3% $Cr_2O_3$, 6.2% PbO

For comparison, a series of catalyst samples were prepared having compositions identical with A-1, B-1, C-1, and D-1, but varying the production method by omitting the precipitation of $FeC_2O_4 \cdot 2H_2O$. Thus these comparative examples were prepared by direct precipitation of $Fe(OH)_2$ from a solution of ferrous sulphate or ferrous chloride. The washing of these precipitates was carried out in the same way as before, until getting a negative test for sulphate in the washwater. Promotion with PbO and $Cr_2O_3$ was effected in an identical manner.

These examples are identified as A-2, B-2, C-2, and D-2. Table 1 shows the chlorine and sulphur contents in all the catalysts prepared:

TABLE 1

|  | Percent Cl content | Percent S content |
|---|---|---|
| Example: |  |  |
| A-1 | 0.0037 | 0.002 |
| B-1 | 0.0043 | 0.002 |
| C-1 | 0.0051 | 0.002 |
| D-1 | 0.0042 | 0.002 |
| Comparative Example: |  |  |
| A-2 | 0.0073 | 0.213 |
| B-2 | 0.0916 | 0.004 |
| C-2 | 0.0081 | 0.167 |
| D-2 | 0.0070 | 0.234 |

The chemical activity of the samples was measured by determination of the conversion of a dry gas having the composition: 60% $H_2$, 20% $N_2$, 10% CO, and 10% $CO_2$. Steam/dry gas: 1:1. Reaction temperature 400° C. and pressure 1 atm. The conversions measured were used for the calculation of the rate constant defined by the rate equation:

$$r = k(P_{CO} - P_{CO_{eq}})$$

where $r$ is the volume of carbon monoxide converted into carbon dioxide calculated as normal litres of CO per gram catalyst per hour, $k$ is the rate constant for the reaction at atmospheric pressure, $P_{CO}$ is the partial pressure (or molar fraction) of CO, and $P_{CO_{eq}}$ is the partial pressure (or molar fraction) of CO when equilibrium has been attained. The rate constants calculated in this way are shown in Table 2.

TABLE 2

|  | Measured start | Velocity 50 days | Constant 300 days |
|---|---|---|---|
| Example: |  |  |  |
| A-1 | 7.6 | 6.7 | 4.1 |
| B-1 | 7.3 | 6.5 | 4.0 |
| C-1 | 13.0 | 8.9 | 5.3 |
| D-1 | 14.1 | 9.2 | 5.7 |
| Comparative example: |  |  |  |
| A-2 | 6.0 | 5.1 | 3.3 |
| B-2 | 8.7 | 4.7 | 3.0 |
| C-2 | 9.0 | 5.2 | 3.2 |
| D-2 | 10.7 | 5.0 | 3.1 |

From Table 1 it can be seen very obviously that the process according to my invention is highly effective in reducing the sulphur content and is greatly superior to any traditional precipitation procedure.

Table 2 shows that, provided the sulphur can be removed, the catalyst is capable of being promoted with PbO, unlike sulphur-containing catalysts that achieve only a brief effect from PbO-promotion.

I claim:

1. In a process for preparing a promotor-containing iron oxide-based high temperature shift catalyst containing a major portion of iron oxide and a minor proportion of an oxidic promotor comprising at least one oxide of chromium, the improvement which comprises the following combination of steps:
    (I) preparing the iron oxide portion of the catalyst by:
        (a) forming a solution of a soluble inorganic salt of iron,
        (b) adding to said solution a substance selected from the class consisting of oxalic acid and its ammonium and alkali metal salts so as to precipitate a coarse crystalline salt of iron with oxalic acid,
        (c) washing the precipitate until a content is achieved of sulphur in free and chemically combined form of less than 50 parts per million, calculated as S on the weight of iron oxide in the finished catalyst, (d) hydrolyzing the precipitate into a flocculent iron hydroxide by treating it with a solution of a base selected from the class consisting of the alkali metal hydroxides and ammonia, (e) isolating and drying the resulting iron hydroxide, (f) calcining said iron hydroxide into iron oxide, (II) adding any oxide of the oxidic promotor as a solution of a compound having the ability to decompose into the oxide on heating, said addition being carried out after the washing step.

2. The process of claim 1, wherein the washing in step (c) is continued until the precipitate contains less than 20 parts per million of sulphur in free and chemically combined form, calculated as S on the weight of iron oxide in the finished catalyst.

3. The process of claim 1, wherein lead oxide is added as a solution of a compound able to decompose into PbO by heating, as part of the promotor portion together with the oxide of chromium in the form of a compound able to decompose into the oxide by heating.

4. The process of claim 1, wherein the oxalic acid reagent regenerated in step (d) is recovered.

5. The process of claim 1, wherein iron sulphate is used as the iron salt in step (a).

6. The process of claim 1, wherein iron chloride is used as the iron salt in step (a).

References Cited

UNITED STATES PATENTS

| 3,414,378 | 12/1968 | Stedman | 23—200 |
| 2,707,706 | 5/1955 | Bauch | 252—472 |
| 2,106,597 | 1/1938 | Ferguson | 23—212 |
| 1,853,771 | 4/1932 | Larson | 23—213 |
| 1,330,772 | 2/1920 | Bosch | 23—213 |
| 3,539,297 | 11/1970 | Aldridge | 23—213 |
| 1,998,470 | 4/1935 | Taylor | 23—236 |

DANIEL E. WYMAN, Primary Examiner

W. J. SHINE, Assistant Examiner

U.S. Cl. X.R.

208—213; 252—439, 470, 472, 474

UNITED STATES PATENT OFFICE
CERTIFICATE OF CORRECTION

Patent No. 3,711,426　　　　　　　Dated January 16, 1973

Inventor(s) Mogens H. Jorgensen

It is certified that error appears in the above-identified patent and that said Letters Patent are hereby corrected as shown below:

In Column 1 before the U.S. Classification insert:

--Foreign Application Priority Data

March 6, 1969 British......69 11930--

Signed and sealed this 10th day of July 1973.

(SEAL)
Attest:

EDWARD M. FLETCHER, JR.　　　　Rene Tegtmeyer
Attesting Officer　　　　　　　Acting Commissioner of Patents